Figure 1:
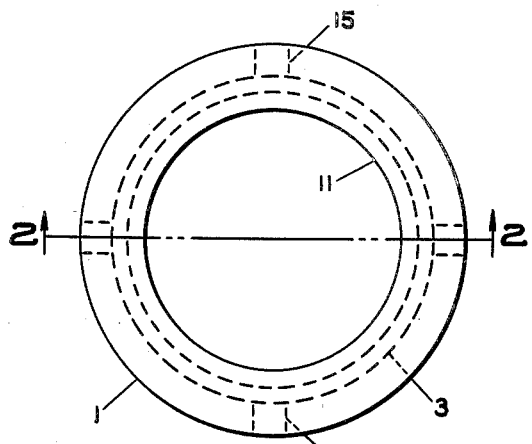

Dec. 23, 1952     L. M. COTCHETT     2,622,949
PLASTIC BEARING
Filed Feb. 11, 1949

*INVENTOR.*
LOUIS M. COTCHETT
BY Robert K. Randall,
atty.

Patented Dec. 23, 1952

2,622,949

UNITED STATES PATENT OFFICE 2,622,949

PLASTIC BEARING

Louis M. Cotchett, Whitman, Mass., assignor to Textile Engineering Corporation, Whitman, Mass., a corporation of Massachusetts Application February 11, 1949, Serial No. 75,829

4 Claims. (Cl. 308—238)

This invention relates to the manufacture of articles of molded synthetic plastic material, and has as its main object the prevention of the change in size and shape which frequently occurs spontaneously or as a result of outside causes after the article is completed.

As is well known to those skilled in the art of molding certain synthetic plastics, particularly thermoplastic and thermo-setting plastic materials, there is not only a shrinkage in the mold, but there is usually a further change in dimension or shape over a period which continues sometimes many months after the molding. In particular, in the case of the high molecular weight polyamide family of synthetic plastic materials, of which the material commercially known as nylon is a familiar example, the shrinkage in the mold is frequently as much as .015 inch per linear inch of molded surface, or in the internal and external diameters of hollow molded shapes, and in the course of months or sometimes years after these articles have been finished, there is a similar change in dimension per linear or diametrical inch. The causes of these changes are obscure and not wholly understood, but they appear to be related to changes in the structure from crystalline to amorphous or vice versa, and to be caused or influenced in part by subsequent changes or extremes of temperature and by subjection to vibration. The usefulness of these substances for bearings and other precision parts has been seriously impaired by these inherent tendencies to growth or internal movement, in spite of their favorable characteristics eminently adapting them for such use in other respects.

Another factor especially unfavorable in the use of these substances for the manufacture of bearings is their high co-efficient of expansion, which further alters the dimensions of the parts made therefrom according to the conditions of temperature to which they may be subjected in use; the thermal co-efficient of expansion of nylon, for instance, is .000057.

Much trouble and loss has arisen in manufacturing precision parts of this material with commercial tolerances on the order of .001 inch plus or minus or closer, since the after-change often exceeds the permitted tolerance agreed to in ordering the articles, and prevents a proper fit. Distortion resulting in the warping of parts made from these materials out of their required true shape also occurs by reason of this growth. These changes may also occur to greater or less degree during and after the molding of other known synthetic plastic materials such as ethylene cellulose and the material commercially available under the trade name of Teflon from E. I. du Pont de Nemours & Co., Wilmington, Delaware.

I have discovered that this troublesome change in dimensions or shape can be minimized or prevented by the use of a rigid preformed reinforcing member disposed within, without, or imbedded in the plastic article, and bonded to the material of the latter in a manner preventing relative movement between the surfaces in mutual contact. The best way that I have yet found for attaining the requisite bond is to anchor the plastic to the member by means of integral portions of the molded plastic extending into recesses or through apertures in the reinforcing member. The latter way is preferred where the nature of the article permits the reinforcing element to be imbedded therein, as then the plastic flows through such apertures in the course of the molding operation and causes the plastic at one surface of the reinforcing element to be joined to the plastic at the other surface thereof by a plurality of integral portions of the plastic itself extending through the wall of the reinforcing element, thus effectually preventing relative movement of the two components of the article. In articles of hollow shape such as sleeve and half-round bearings, where a reinforcing member conforming to the shape and curvature of the bearing surfaces is employed, substantially all of the plastic within the reinforcing member and comprising the bearing surface is confined within and anchored to a tubular or semi-cylindrical reinforcing element.

In practice the reinforcing element is made of metal in cases where no special requirements compel the use of other materials; but other materials are used in particular instances, as where di-electric properties are required, in which cases a non-conducting material such as glass in rigid form, ceramics, or hard fiber is employed. Brass has been found to be suitable for many purposes, as its co-efficient of expansion is so low in the range of ordinary room temperatures as to be negligible. A special phase of the invention is the forming of the reinforcing element with portions extending angularly from its main body, whereby these portions will engage the interior of the mold both to space the walls of the element from the walls of the mold so that the element will be completely covered at both surfaces by the plastic, and also so that the element will be correctly positioned longitudinally, and will be concentrically disposed in the mold in the formation of tubular and half-round bearings and related shapes.

Figure 2:
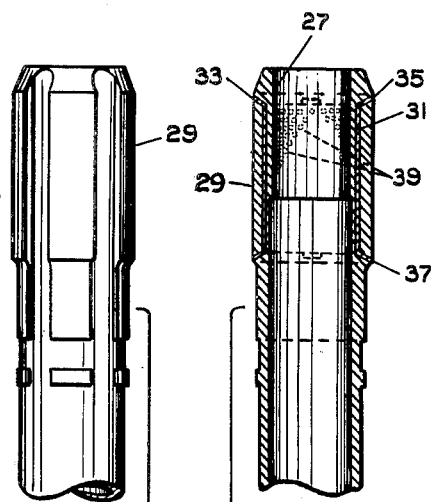

Illustrative embodiments of the invention are shown in the accompanying drawings, in which Fig. 1 is an end view, and Fig. 2 a section on line 2—2 of Fig. 1, of a sleeve bearing employing the invention.

Figure 3:
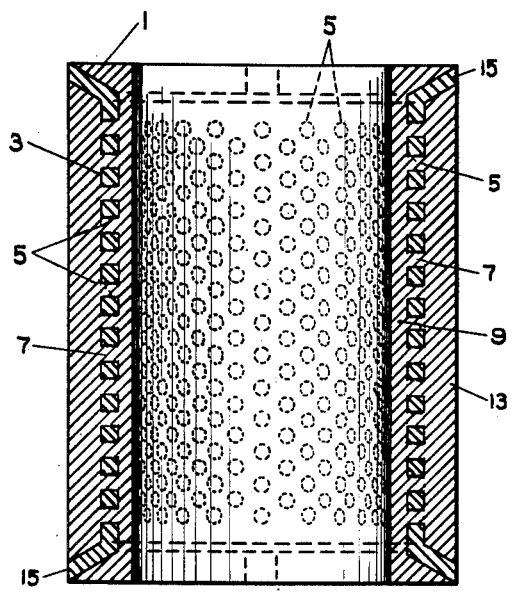
Figure 4:
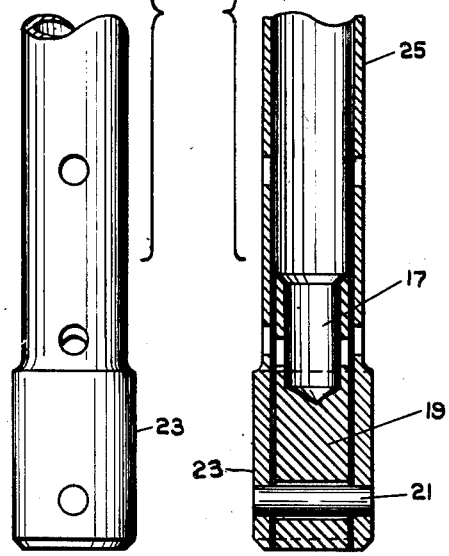

Fig. 3 is a side elevation, and Fig. 4 an axial section, of a bolster for spinning spindles, also embodying the invention.

In the embodiment of Figs. 1 and 2 is shown a plain cylindrical sleeve bearing composed of synthetic plastic material 1 of any of the aforementioned kinds or of any other suitable or preferred kind, having imbedded in its walls concentrically with the axis of the bearing a reinforcing element 3 in the form of a cylindrical metallic tube having a plurality of holes 5 formed in its walls. Through these holes 5 extend integral portions 7 of the plastic material 1 that join the relatively thin inner body 9 having the surface 11 forming the wearing surface integrally with the relatively thick outer body 13 whereby the bearing is mounted in its working position in the machine or other structure in which it is employed. With the perforations 5 provided in profusion and distributed all over the walls of the metallic tube 3 both lengthwise and circumferentially, the inner and outer portions 9 and 13 of the plastic body 1 are anchored so completely by the integral portions 7 to the reinforcing element 3 throughout its length and circuit that relative movement is impossible and any growth, shrinkage, elongation, or warping is either prevented or reduced to a minimum negligible in most instances.

To center the reinforcing element 3 in the mold and to locate its main body in spaced relation to the walls thereof so that it will be completely imbedded in the thickness of the plastic and overlaid at both its inside and its outside surfaces by the plastic when the latter is introduced into the mold, lugs 15 are formed integrally on the metal cylinder 3 at three or more points in the periphery of each end, these lugs radiating obliquely from the cylinder 3 to such extent and at such angle, and being so formed at their extremities, that they fit into the angle where the outer cylindrical wall of the founding space within the mold (not shown) intersects the plane annular surfaces which form the ends of the bearing cast therein. Thus when reinforcing element 3 is inserted in the mold before casting, this member 3 is held in correctly spaced relation to the walls of the mold in both radial and axial directions, resulting in its being imbedded in the finished bearing as shown in Fig. 2.

Figs. 3 and 4 show the application of the invention principle in the manufacture of plastic bolsters for spinning spindles. Such bolsters form the bearings for these steel spindles which are supported therein in vertical relation by having their blunt conical lower ends stepped in a correspondingly shaped cavity 17 in a plug 19 secured by a pin 21 in the bottom portion 23 of an elongated sleeve 25 formed of plastic and having its bore materially larger than the diameter of the spindle, the guiding and supporting surface which holds the spindle true during its extremely rapid revolution being the portion 27 of reduced diameter at the extreme upper end of the bolster. This bearing surface 27, though needing to be of relatively brief extent axially of the bolster, must be of very precise fit to the diameter of the spindle, in order to prevent vibration of the spindle when the latter attains its running speed of from 6,000 to 10,000 R. P. M., and also to prevent frictional drag on the spindle.

To inhibit or prevent growth, shrinking, or warping of the portion 29 at the top end of the bolster in which such bearing surface 27 is formed, a perforated metallic reinforcing cylinder 31 of the same type as the member 3 of Fig. 2 is employed. This reinforcing element 31 is imbedded in the walls of portion 29 in concentric relation with the axis of the bolster, by inserting it in the mold within which the bolster is cast and holding it in spaced relation to the walls of the mold by the engagement of four integral lugs 33 on each end of member 31 with the interior wall of the mold. The position of member 31 in the length of the bolster is fixed by engagement of these lugs 33 in the interior angles of the mold which form the shoulders 35, 37, on the portion 29 of the bolster. As before, the flow of the plastic material through the perforations 39 in reinforcing element 31 unites the plastic inside such element integrally with the plastic surrounding it, thus anchoring the plastic to the reinforcing element in a manner preventing relative movement between the two.

A collateral benefit derived from the invention is that the reinforcing element's resistance to the plastic's tendency to change its shape or dimensions, during the initial shrinkage as it hardens in the mold, causes stresses in the plastic which line up the molecules along a common line of stress, thus causing these stressed portions of the plastic to have greater tensile strength, thereby increasing the material's resistance to abrasion.

The shape and design of the reinforcing element is varied as needed or desired, and in certain uses a helical wire coil having spaced turns is used instead of the perforated cylinder, to prevent change in the diameter and shape in cross-section of sleeve type bearings. In other instances, a cylinder of wire mesh is employed instead of the perforated tube shown.

The invention makes it possible now to produce nylon and other plastic bearings which remain truly precise in their shape and dimensions for a period of use long enough to make their superior frictional qualities available in uses where long life and reliability are imperative, and thus to supersede bearings of metal and other more costly materials which require more effort and expense in their making.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof.

What I claim is:

1. A sleeve type bearing comprising a synthetic plastic forming the bearing surface and a reinforcing element fixed therein and formed of relatively rigid material which is a non-conductor of electricity.

2. A bolster for spinning spindles comprising a cylinder composed of synthetic plastic material, and a foraminous metallic cylinder encased within the plastic material in concentric relation therewith, with portions of the plastic material extending through apertures in the walls of the metallic cylinder and being integral with the plastic material covering the inner and outer surfaces of the metallic cylinder.

3. A sleeve type machine bearing comprising a synthetic plastic material forming the bearing surface and a metallic element imbedded in the plastic material, such element having a plurality of apertures distributed both lengthwise and circumferentially thereof, integral portions of the plastic material extending through the element and connecting a relatively thin wall of the plastic material at the inner surface of the element with a relatively thick wall of the plastic material at the outer surface thereof.

4. A bolster for spinning spindles comprising a tubular body made of nylon forming the bearing surface and a foraminous metallic tube embedded therein in substantially parallel relation to the bearing surface and anchored to the nylon lying inside and outside the tube by integral portions of the nylon extending through the openings in the metallic tube and distributed around and throughout the length of the metallic tube.

LOUIS M. COTCHETT.

REFERENCES CITED

The following references are of record in the file of this patent:

UNITED STATES PATENTS

| Number | Name | Date |
|---|---|---|
| 400,600 | Rockwell | Apr. 2, 1889 |
| 1,164,125 | Schroder | Dec. 14, 1915 |
| 1,655,167 | Short | Jan. 3, 1928 |
| 2,219,054 | Palm et al. | Oct. 22, 1940 |
| 2,202,013 | Loughead | May 28, 1940 |
| 2,246,086 | Austin | June 17, 1941 |
| 2,312,293 | Weiss | Feb. 23, 1943 |
| 2,459,598 | Stott | Jan. 18, 1949 |

FOREIGN PATENTS

| Number | Country | Date |
|---|---|---|
| 433,121 | Great Britain | Aug. 9, 1935 |